United States Patent
Jayaweera et al.

(10) Patent No.: US 9,339,757 B2
(45) Date of Patent: May 17, 2016

(54) RATE ENHANCEMENT OF $CO_2$ ABSORPTION IN AQUEOUS POTASSIUM CARBONATE SOLUTIONS BY AN AMMONIA-BASED CATALYST

(71) Applicant: SRI INTERNATIONAL, Menlo Park, CA (US)

(72) Inventors: Indira S Jayaweera, Menlo Park, CA (US); Palitha Jayaweera, Sunnyvale, CA (US); Gopala N. Krishnan, San Jose, CA (US); Angel Sanjurjo, Menlo Park, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 0 days.

(21) Appl. No.: 14/712,180

(22) Filed: May 14, 2015

(65) Prior Publication Data

US 2015/0246310 A1 Sep. 3, 2015

Related U.S. Application Data

(63) Continuation of application No. PCT/US2013/069368, filed on Nov. 11, 2013.

(60) Provisional application No. 61/727,017, filed on Nov. 15, 2012, provisional application No. 61/774,195, filed on Mar. 7, 2013.

(51) Int. Cl.
*B01D 53/14* (2006.01)
*C01B 31/20* (2006.01)
*B01D 53/62* (2006.01)
*B01D 53/18* (2006.01)

(52) U.S. Cl.
CPC ........ *B01D 53/1493* (2013.01); *B01D 53/1418* (2013.01); *B01D 53/1425* (2013.01); *B01D 53/1475* (2013.01); *B01D 53/18* (2013.01); *B01D 53/62* (2013.01); *C01B 31/20* (2013.01); *B01D 2251/2062* (2013.01); *B01D 2251/306* (2013.01); *B01D 2251/606* (2013.01); *B01D 2252/504* (2013.01); *B01D 2257/504* (2013.01); *Y02C 10/04* (2013.01); *Y02C 10/06* (2013.01); *Y02C 10/08* (2013.01); *Y02P 20/152* (2015.11)

(58) Field of Classification Search
CPC ........... B01D 53/1493; B01D 53/1425; B01D 53/1418; B01D 53/18; B01D 53/1475; B01D 53/62; B01D 2252/504; B01D 2257/504; B01D 2251/306; B01D 2251/2062; B01D 2251/606; C01B 31/20; Y02C 10/06; Y02C 10/08; Y02C 10/04; Y02P 20/152
USPC ........................................... 423/220
See application file for complete search history.

(56) References Cited

U.S. PATENT DOCUMENTS 7,981,196 B2 * 7/2011 Kang .................... B01D 53/62 95/183
8,292,989 B2 * 10/2012 Kozak ................ B01D 53/1493 95/169

* cited by examiner

*Primary Examiner* — Colleen Dunn
*Assistant Examiner* — Haytham Soliman
(74) *Attorney, Agent, or Firm* — Richard Aron Osman

(57) ABSTRACT

The technical field of the invention is $CO_2$ capture and sequestration, as well as gas separation and purification technologies. In an aspect is a process for capturing purified $CO_2$ from a $CO_2$-containing gas, comprising steps: (a) contacting in an absorber column the $CO_2$-containing gas with an absorption solution comprising water, ammonia, and potassium carbonate, to enable adsorption of $CO_2$, thereby producing a $CO_2$-depleted gas and a $CO_2$-rich solution; and (b) subjecting the $CO_2$-rich solution to desorption conditions in a regeneration column producing a purified $CO_2$ gas stream and a $CO_2$-depleted solution.

15 Claims, No Drawings

RATE ENHANCEMENT OF CO$_2$ ABSORPTION IN AQUEOUS POTASSIUM CARBONATE SOLUTIONS BY AN AMMONIA-BASED CATALYST

CROSS-REFERENCE TO RELATED APPLICATIONS

This application claims priority to U.S. Ser. Nos. 61/727,017, filed Nov. 15, 2012, and 61/774,195, filed Mar. 7, 2013 the contents of which are incorporated herein by reference.

BACKGROUND

Historically, CO$_2$ capture processes within power plants have required a significant amount of energy, which reduces the net power output of the power plant. For example, the output of a 500 MW (net) coal-fired power plant may be reduced to about 400 MW (net) after CO$_2$ capture—a 20% energy penalty. To be commercially viable, this energy penalty needs to be reduced substantially. Therefore, new and improved methods for CO$_2$ capture are required to generate electricity efficiently from coal-fired power plants with reduced energy penalties.

Ammonia-based CO$_2$ capture has been considered as the best alternative to conventional amine process, which is very costly. There are several ammonia-based technologies currently under development. Some major challenges of these processes are (1) high energy intensive chilling requirement for flue gas cooling for absorber operation at temperatures<10° C., and (2) large water usage and energy intensive sour stripping for ammonia emission reduction.

Relevant art: US 2012/0129246.

SUMMARY

In an aspect is a process for capturing purified CO$_2$ from a CO$_2$-containing gas, comprising steps: (a) contacting in an absorber column the CO$_2$-containing gas with an absorption solution comprising water, ammonia, and potassium carbonate, to enable adsorption of CO$_2$, thereby producing a CO$_2$-depleted gas and a CO$_2$-rich solution; and (b) subjecting the CO$_2$-rich solution to desorption conditions in a regeneration column producing a purified CO$_2$ gas stream and a CO$_2$-depleted solution.

In embodiments:

the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1;

the absorption solution in a third section of the absorber column has a lower ammonia concentration relative to the absorption solution in a first section of the absorber column and a higher ammonia concentration relative to the absorption solution in a second section of the absorber column;

the absorption solution comprises ammonia, ammonium carbonate, ammonium bicarbonate, potassium carbonate, and potassium bicarbonate;

the process further comprises pumping the CO$_2$-depleted solution to the absorber column;

the process further comprises the steps: (c) pumping the CO$_2$-depleted solution from a first section of the regeneration column to a flash chamber, wherein the flash chamber removes ammonia from the CO$_2$-depleted solution to form an ammonia-depleted CO$_2$-depleted solution; and (d) pumping the ammonia-depleted CO$_2$-depleted solution to the absorber column;

the regeneration column comprises a regeneration solution, and a temperature gradient exists within the regeneration column such that the temperature of the regeneration solution at a second section of the regeneration column is lower than the temperature of the regeneration solution at a first section of the regeneration column;

the desorption conditions comprise a temperature above 30° C. and a pressure above 5 bar;

the absorption solution in a bottom section of the absorber column is maintained at a temperature of between 20-40° C.;

the process further comprises pumping the CO$_2$-depleted solution to the absorber column, and wherein the absorption solution comprises ammonia, ammonium carbonate, ammonium bicarbonate, potassium carbonate, and potassium bicarbonate;

the process further comprises pumping the CO$_2$-depleted solution to the absorber column, and wherein the regeneration column comprises a regeneration solution, and a temperature gradient exists within the regeneration column such that the temperature of the regeneration solution at a second section of the regeneration column is lower than the temperature of the regeneration solution at a first section of the regeneration column;

the process further comprises pumping the CO$_2$-depleted solution to the absorber column, and wherein the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1;

the process further comprises the steps: (c) pumping the CO$_2$-depleted solution from a first section of the regeneration column to a flash chamber, wherein the flash chamber removes ammonia from the CO$_2$-depleted solution to form an ammonia-depleted CO$_2$-depleted solution; and (d) pumping the ammonia-depleted CO$_2$-depleted solution to the absorber column, and wherein the absorption solution comprises ammonia, ammonium carbonate, ammonium bicarbonate, potassium carbonate, and potassium bicarbonate;

the process further comprises the steps: (c) pumping the CO$_2$-depleted solution from a first section of the regeneration column to a flash chamber, wherein the flash chamber removes ammonia from the CO$_2$-depleted solution to form an ammonia-depleted CO$_2$-depleted solution; and (d) pumping the ammonia-depleted CO$_2$-depleted solution to the absorber column, and wherein the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1;

the first section is a bottom section and the second section is a top section of the absorber column;

the first section is a bottom section, the second section is a top section, and the third section is a middle section of the absorber column;

the first section is a bottom section and the second section is a top section of the regeneration column.

In an aspect is a system for carrying out the method as above, the system comprising: the absorber column containing the absorption solution and configured to enable absorption of CO$_2$ from the CO$_2$-containing gas into the absorption solution to form the CO$_2$-rich solution; a regeneration column in fluid communication with the absorber column and configured to remove $CO_2$ from the $CO_2$-rich solution to form a purified $CO_2$ gas stream and a $CO_2$-depleted solution; and an optional flash chamber in fluid communication with the regeneration column and in fluid communication with the absorber column, and configured to remove ammonia from a regeneration solution obtained from the regeneration column to form a $CO_2$-depleted ammonia-depleted solution.

In an aspect is a system for capturing purified $CO_2$ comprising: an absorber column containing an absorption solution comprising water, ammonia, and potassium carbonate; a regeneration column in fluid communication with the absorber column; and an optional flash chamber in fluid communication with the regeneration column and in fluid communication with the absorber column.

In embodiments:

the absorber is configured to enable adsorption of $CO_2$ from a $CO_2$-containing gas, thereby producing a $CO_2$-depleted gas and a $CO_2$-rich solution;

the regeneration column is configured to accept the $CO_2$-rich solution from the absorber and to subject the $CO_2$-rich solution to desorption conditions producing a purified $CO_2$ gas stream and a $CO_2$-depleted solution;

the flash chamber is configured to receive $CO_2$-depleted solution from the regeneration column and to remove ammonia from the $CO_2$-depleted solution to form an ammonia-depleted $CO_2$-depleted solution;

the regeneration column is further configured to receive an ammonia-depleted $CO_2$-depleted solution from the flash chamber;

the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1;

the absorption solution in a third section of the absorber column has a lower ammonia concentration relative to the absorption solution in a first section of the absorber column and a higher ammonia concentration relative to the absorption solution in a second section of the absorber column;

the absorption solution comprises ammonia, ammonium carbonate, ammonium bicarbonate, potassium carbonate, and potassium bicarbonate;

the system further comprises a conduit providing fluid communication between a section of the regeneration column containing a $CO_2$-depleted solution and the absorber column;

the system further comprises a conduit providing fluid communication between a section of the regeneration column containing a $CO_2$-depleted solution and the flash chamber;

the regeneration column comprises a regeneration solution, and a temperature gradient exists within the regeneration column such that the temperature of the regeneration solution at a first (e.g., bottom) section of the regeneration column is higher than the temperature of the regeneration solution at a second (e.g., top) section of the regeneration column;

the conditions within the regeneration column are desorption conditions and comprise a temperature above 30° C. and a pressure above 5 bar;

the absorption solution in a bottom section of the absorber column is maintained at a temperature of between 20-40° C.;

the first section is a bottom section and the second section is a top section of the absorber column;

the first section is a bottom section, the second section is a top section, and the third section is a middle section of the absorber column; and the first section is a bottom section and the second section is a top section of the regeneration column.

These and other embodiments will be apparent to the skilled artisan based on the disclosure provided herein, including the examples and claims.

DETAILED DESCRIPTION OF PARTICULAR EMBODIMENTS

The technical field of the invention is $CO_2$ capture and sequestration, as well as gas separation and purification technologies.

Herein is a novel process that uses industrially available common salts (ammonium carbonate and potassium carbonate) in integrated absorption and regeneration trains to reduce the energy usage for $CO_2$ capture by 50% and the water usage by more than 75% compared to currently available best ammonia based process. The process can operate near or above ambient conditions for absorber operation for $CO_2$ capture and high pressure solvent regeneration to release $CO_2$ at high pressure ready for utilization or sequestration. The process can use multiple absorbers and regenerators to capture $CO_2$ from flue gas streams from power plants and other industrial $CO_2$ sources using mixture of ammonia, ammonium carbonate and potassium carbonate solutions. The process—multiple absorbers and regenerators—can be designed to operate with reduced ammonia emissions and reduced water use.

The process incorporates the following aspects and advantages: a method for promoting the rate of $CO_2$ absorption into potassium carbonate; a method for selective regeneration of ammonium and potassium salts; a method for reduction of ammonia vapor pressure in the absorber; a method for reduction of ammonia vapor pressure in the regenerator; a method of reducing water use for ammonia emission reduction; a method of using ammonia based solution for $CO_2$ capture with reduced energy use; a method for reducing sour stripper energy consumption; a method for high loading of carbon dioxide into a potassium carbonate and ammonia mixture without precipitating solids (or with reduced solids formation); and a method for reducing heat of $CO_2$ absorption for ammonia solutions by adding salts. Without wishing to be bound by theory, these and other enhancements are believed due to ammonia absorbing $CO_2$ at the gas/liquid interface and "shuttling" the $CO_2$ to the (larger and slower diffusing) potassium carbonate.

The process is a green technology and does not produce any hazardous wastes. It is based on off-the-shelf low-cost chemicals that react with $CO_2$ at a moderate temperature and can be released as high-purity high-pressure $CO_2$ ready for storage. The mixed-salt system has an inorganic moiety that has higher diffusion coefficient that enhances the gas-liquid mass transport and reduces the activation energy of the reaction between solvent and $CO_2$. In addition, the technology uses a selective regeneration for utilizing optimum characteristics of each salt.

System—Absorber Column

In an aspect is a system for capturing purified $CO_2$ comprising: an absorber column containing an absorption solution comprising water, ammonia, and potassium carbonate; a regeneration column in fluid communication with the absorber column; and an optional flash chamber in fluid communication with the regeneration column and in fluid communication with the absorber column.

The system comprises an absorber column, and the absorber column is configured to enable adsorption of $CO_2$ from a $CO_2$-containing gas, thereby producing a $CO_2$-depleted gas and a $CO_2$-rich solution.

In embodiments, the absorber column is a vertically-oriented column (i.e., with a height greater than a circumference). The absorber column is divided into sections, wherein each section may be a region within a single-stage absorber column, or wherein each section may be a stage within a multi-stage absorber column. Thus a 'stage' is a column that may contain a single section or a plurality of sections therein. The absorber column may be a single-stage absorber column (i.e., only a single physical column) with a plurality of sections within the single stage, or may be a multi-stage absorber column (i.e., a plurality of separate columns), wherein each stage is a single section.

In embodiments, the absorber column comprises two sections, and optionally comprises a third section. In an embodiment, the first section is the 'bottom section' of the absorber column, and the second section is the 'top section' of the absorber column. When the optional third section is not present, the first and second sections will encompass the entire absorber column. The optional third section, when present, is the 'middle section' of the absorber column, such that the first, second, and third sections encompass the entire absorber column.

In embodiments of the single-stage column, the various sections (i.e., first, second, and optional third sections) are separated by a physical barrier such as a screen, baffles, or the like. In embodiments, such barrier is a barrier against liquids but is permeable to gases. In embodiments, the first section is the 'bottom section' and extends from the bottom of the absorber column (i.e., the lowest-most point in the column) to the barrier between the first and second section (or first and third section, when the latter is present). The second section is the 'top section' and extends from the top (i.e., highest point) of the absorber column to the barrier between the second and first section (or second and third section, when the latter is present). The third section, when present, is the 'middle section' and exists between the two barriers. When the middle section is absent, the first and second sections may be equal in size (i.e., each 50% of the total column height), or may be unequal in size (e.g., the first section is 20, 30, 40, 60, 70, or 80% of the total column height). When the middle section is present, the three sections may be equal in size (i.e., each 33% of the total column height) or may be unequal in size, in which case any suitable proportions of the three sections (e.g., 10/80/10, or 30/40/30, or 50/30/20, etc.) may be used.

In embodiments of the single-stage column, no physical barriers are present, and the various sections are identifiable in part by physical location and in part with reference to the contents of the absorption solution as described herein. For example, in a two-section column (i.e., the optional third section is not present), the first section is the 'bottom section' and extends from the bottom-most point of the absorber column. The second section is the 'top section' and extends from the top-most point of the absorber column. The two sections encompass the entire height of the absorber column. The sections meet, and the meeting point/area may be at the midpoint of the column (halfway between the extremities) or may be at least 10, 20, 30, 40, or 50% of the distance between the mid-point and either extremity. For example, the first section may comprise the bottom 30, 40, 50, 60, 70, or 80% of the total column height. Correspondingly, the second section may comprise the top 20, 30, 40, 50, 60, or 70% of the total column height. In a three-section column (i.e., the optional third section is present), the third (i.e., middle) section may encompass the midpoint of the column, and may comprise between 15-40 or 20-35% of the total column height, with the first and second sections forming the remaining portions. It is not, however, necessary for the middle section to encompass the midpoint—the middle section is merely between the first and second sections. In an embodiment, the sections are all of the same size (i.e., in a two-section column they are both 50% of the height and in a three-section column they are all 33%). In embodiments, the sections can be identified and recognized by the composition of the absorption solution therein. For example, the first section is that which has a specific ratio of ammonia to potassium as described herein.

In embodiments of the multi-stage column, the absorber column comprises a plurality of separate, individual absorber columns with linkages between the stages. The linkages provide fluid (i.e., liquid, gas, or both) communication between successive stages. In such embodiments, the absorber column may comprise two or three (or more than three) stages each containing an absorption solution and connected via a linkage to one or more adjacent stage(s). For example, a first stage is the 'bottom section' of the absorber column, a second stage is the 'top section', and an optional third stage is the 'middle section' of the absorber column.

In an embodiment, a physical barrier between sections is present, and liquid is collected to a tray at the bottom of the top absorber column section. The liquid collected in the tray can overflow down to the bottom absorber column section. A portion of the liquid collected on the tray can be fed back to the top of the absorber column and/or get mixed with liquid in the top section of the absorber column. This combined flow is then pumped to the regeneration column.

In the mixed-salt technology, both sections of the absorption column have enhanced reaction rates compared to state-of-the-art ammonia or carbonate processes. The $CO_2$ absorption rate at the top of the absorber (second section) is high due to the low $CO_2$ loading of the solution (leaner solution from the regenerator) and its relatively high pH. In addition, rate enhancement near the bottom of the top section is achieved by ammonia acting as a promoter to reduce the boundary layer associated with the gas-to-liquid mass transfer for gaseous $CO_2$ absorption and the aqueous $CO_3^{2-}$ solution for the potassium carbonate side of the absorber.

Absorption Solution

Each section of the absorber column contains an absorption solution, and the composition of the absorption solution may vary between the various sections. The composition of the absorption solution in any section is dependent upon a variety of factors such as the material input to the section and the conditions (e.g., temperature, etc.) within the section. The material inputs to the various sections is determined by the interconnectivity arrangement of the system, as described herein. Generally, the absorption solution comprises water (i.e., an aqueous solution), dissolved ammonia, and potassium carbonate. Due to various factors including reactions between the ammonia and potassium carbonate, dissociation, and the like, other species may be present in the absorption solution. Such other species include ammonium salts such as ammonium carbonate and ammonium bicarbonate, and potassium salts such as potassium bicarbonate.

In embodiments, the absorption solution is an aqueous mixed salt system comprising potassium carbonate, potassium bicarbonate, $NH_3$, ammonium carbonate and ammonium bicarbonate, in addition to water as solvent. In embodiments, the total inorganic salt concentration in the absorber column may vary between 20-40 wt %.

In embodiments, the first absorber column section is enriched in ammonia (and therefore also ammonium salts, such that the section is enriched in total dissolved ammonia). For example, the first absorber column section operates with a dissolved ammonia (i.e., $NH_3$ plus $NH_4^+$) to total potassium ratio that is greater than 1, 1.1, 1.2, 1.3, 1.4, 1.5, 2, 3, or 5. The relatively high concentration of ammonia provides enhanced $CO_2$ capture rate and overall capture capacity. Accordingly, the first section is typically the 'bottom section' of the absorber column, and in operation, receives a $CO_2$-containing gas to be treated (e.g., a flue gas from a power plant, etc.). This embodiment is particularly suitable for a system wherein the optional third section is not present.

In embodiments, the first absorber column section is also enriched in potassium. For example, the ammonia to potassium ratio is between 1:1 and 1:10, such as 1:1, 1:2, 1:3, 1:4, 1:5, 1:6, 1:7, 1:8, 1:9, or 1:10. The high potassium concentration in the first section means that the $CO_2$-containing gas to be treated can enter the system without the need for cooling, even if such $CO_2$-containing gas is at high temperature. This embodiment is particularly suitable for a system wherein the optional third section is present.

In embodiments, the second absorber column section is depleted in ammonia. In embodiments, the second section is enriched with potassium. For example, the second absorber column section operates with a dissolved ammonia (i.e., $NH_3$ plus $NH_4^+$) to potassium ratio less than 1, 0.9, 0.8, 0.7, 0.6, 0.5, 0.4, or 0.3. The second section is typically the 'top section' and includes the absorber column outlet. The reduced ammonia concentration in the second section therefore reduces the overall ammonia emissions from the absorber column, thereby reducing the need for ammonia-capture technologies and reducing or eliminating waste. In embodiments where the optional third section is present, the second section also functions to capture any ammonia emissions originating from the third section.

In embodiments, the third absorber column section is present and is enriched in ammonia (and therefore also ammonium salts, such that the section is enriched in total dissolved ammonia) relative to the second section. For example, the third absorber column section operates with a dissolved ammonia (i.e., $NH_3$ plus $NH_4^+$) to total potassium ratio that is greater than 1, 1.1, 1.2, 1.3, 1.4, 1.5, 2, 3, or 5. In embodiments, the absorption solution in the third section of the absorber column has a higher ammonia concentration relative to the absorption solution in a first (i.e., top) although a lower ammonia concentration relative to the absorption solution in a second (i.e., bottom) sections of the absorber column. In such embodiments, the absorption solution throughout the absorber column has an ammonia concentration gradient, progressing from the highest concentration at the bottom of the column to the lowest concentration at the top of the column. In areas with relatively high concentration of ammonia, the ammonia provides enhanced $CO_2$ capture rate and overall capture capacity. In embodiments, the third section is the 'middle section' of the absorber column.

In embodiments of operation, the $CO_2$-containing gas to be treated enters the absorber from the bottom section. The input pressure may be ambient pressure (1 atm) or higher than ambient. The input temperature will depend on the source of the gas and the configuration of the system, but may for example be elevated (e.g., greater than or equal to 35, 40, 45, 50, 55, or 60° C.).

In embodiments of operation, the absorption solution within the absorber column exists at certain conditions of temperature and pressure. For example, the temperature within the absorber column (i.e., of the absorption solution) is ambient temperature or above ambient (e.g., up to 30, 35, or 40° C.). For example, the pressure with the absorber column (i.e., the system pressure generated by flow of liquids and gases) is ambient pressure or higher than ambient.

In embodiments, the outputs of the absorber column comprise a liquid and a gas. The liquid output is an aqueous $CO_2$-rich solution, and is removed from the bottom of the absorber column. The $CO_2$-rich solution is pumped from the bottom of the absorber column to the regeneration column to be treated as described herein. The gaseous output is a $CO_2$-depleted gas. The $CO_2$-depleted gas is enriched in $N_2$ and contains other components such as $O_2$. In some embodiments, a potassium-rich aqueous solution may be removed from the top of the absorber column and pumped to the bottom of the regeneration column.

Without wishing to be bound by theory, the undissociated ammonia present in the mixed salt has a very high diffusion rate within the aqueous solution compared to other dissolved species (ionized and undissociated) such as carbonate, bicarbonate, or dissolved carbon dioxide. Therefore, the $NH_3$ (g) reacts with $CO_2$ (g) at the gas/liquid interface forming a transient complex that is then dissociated by several pathways: (1) $NH_3CO_2^* + NH_3$ (g)$\rightarrow NH_2CO_2^- + NH_4^+$ and (2) $NH_3CO_2^* + H_2O$ (l)$\rightarrow HCO_3^- + NH_4^+$. In addition, the complex —$NH_3CO_2^*$— can dissociate back to $NH_3$ (aq) and $CO_2$ (aq). The net result is an increase in dissolved $CO_2$ (aq). The key features of the technology are the in-situ inorganic moiety which is ammonia based, has a higher diffusion coefficient, and enhances the gas/liquid mass transport for enhancing the rate of $CO_2$ capture. The ammonia cycle is: $CO_2 \rightarrow NH_3CO_2 \rightarrow H_2O \rightarrow NH_4^+ + OH^- \rightarrow H_2O + NH_3 \rightarrow CO_2$. The rate of $CO_2$ absorption is enhanced by having ammonia act as a promoter that shuttles the $CO_2$-carbonate ion across the gas/liquid interface into the solution and increases the partial pressure of $CO_2$ in the dissolved phase. This increases the rate of $CO_2$ collision with carbonate ion and results in an increase in the rate of $CO_2$ absorption.

System—Regeneration Column

The main purpose of the regeneration column is to desorb $CO_2$ from the $CO_2$-rich solution and to regenerate the absorption solution. The regeneration column is designed in a manner that can produce $CO_2$-lean solutions with varying ammonia to potassium compositions, and such solutions are reused as absorption solution. The regenerated $CO_2$-lean solutions are therefore pumped into various sections (stages) of the $CO_2$-absorber.

In embodiments, the regeneration column is a vertically-oriented column (i.e., with a height greater than a circumference). The regeneration column may comprise sections therein, wherein a 'section' is a region within the regeneration column with a distinct function or containing a regeneration solution with a distinct composition.

The $CO_2$-rich solution is extracted from the absorber column (e.g., from the bottom section of the absorber column) and is pumped to the regeneration column. The $CO_2$-rich solution enters the regeneration column at or near the top of the column. Once inside the regeneration column, the solution is referred to herein as a regeneration solution. The regeneration solution is subjected to conditions suitable for desorption of $CO_2$ and formation of a purified $CO_2$ gas stream. Thus, outputs of the regeneration column include a purified $CO_2$ gas stream and a $CO_2$-depleted solution. The purified CO2 gas stream may be extracted from any suitable location within the regeneration column, such as the top or near the top section of the column (e.g., within 1, 2, 3, 4, or 5% of the uppermost point of the column).

In embodiments, the $CO_2$-depleted solution is returned directly to the absorber column. In other embodiments, the $CO_2$-depleted solution is further treated to form an ammonia deficient potassium carbonate stream (i.e., a potassium rich stream), an ammonia rich potassium carbonate stream, or both. In an embodiment, the regeneration column produces both of these streams, and the ammonia rich stream is pumped to the mid-section of the absorber column (e.g., the vertical midpoint or within 5, 10, 15, 20, or 25% of the vertical midpoint of the absorber column), and the ammonia deficient stream is pumped to the bottom of the absorber column (i.e., the lowest point or within 5, 10, or 15% of the lowest point of the absorber column).

Further treatment of the $CO_2$-depleted solution to form an ammonia deficient and ammonia rich potassium carbonate streams may be carried out in a flash chamber. In this approach, the methods further involve pumping the $CO_2$-depleted solution from a first section of the regeneration column to the flash chamber, wherein the flash chamber removes ammonia from the $CO_2$-depleted solution to form an ammonia-depleted $CO_2$-depleted solution; and pumping the ammonia-depleted $CO_2$-depleted solution to the top of the absorber column.

In embodiments, the regeneration column operates at desorption conditions, which comprise a high pressure (e.g., >5, 10, 15, or 20 bar) and lower temperature (e.g., <140° C. but >20, 25, or 30° C.). In embodiments, the regeneration column operates at a temperature within the range 100-180° C. The regeneration solution from the regeneration column bottom is extracted and pumped to the flash chamber. The flash chamber removes most (>50, 60, 70, 80, 90, or 95%) of the ammonia from the regeneration solution. The conditions of the flash chamber are adjusted to maximize the $NH_3$ removal from the lean solution (e.g., 140-200° C. and <150 psi (10 bar)) with minimum water vaporization. At the top section of the flash camber, evaporated water and ammonia are condensed and pumped back to the regeneration column. The liquid leaving the flash chamber bottom has a reduced ammonia concentration, and this solution can also be pumped to the top of the absorber column. As necessary, the operating conditions of the flash chamber can be adjusted to reduce the ammonia concentration to be <4 molal.

In embodiments of operation, the temperature and pressure of the regeneration column is monitored and regulated. In embodiments, the temperate of the regeneration solution at the top of the regeneration column is kept below 70° C. to reduce ammonia and water slips.

In embodiments, a temperature gradient is present along the regeneration column height: the regeneration solution at a second section of the column is at a relatively lower temperature (e.g. 30-90° C.) and the regeneration solution at a first section of the column is at a relatively higher temperature (e.g. 100-200° C.). The higher temperature at the first section of the column assists in stripping ammonia from the solution. In such embodiments, the first section is the 'bottom section' of the regeneration column, and the second section is the 'top section' of the regeneration column. Accordingly, in an embodiment, a temperature gradient exists within the regeneration column such that the temperature of the regeneration solution at a second (i.e., top) section of the regeneration column is lower than the temperature of the regeneration solution at a first (i.e., bottom) section of the regeneration column.

It will be appreciated that temperatures mentioned herein refer to the regeneration solution within the regeneration column.

Where necessary, heat may be supplied to the regeneration column via steam or an external heater. The pressure of the regeneration column can be regulated, such as maintaining a pressure above 5, 10, 15, 20, 25, 30, or 35 bar. Pressure can be maintained, for example, with the use of a back pressure regulator. In a typical operation, the regeneration column pressure will be maintained between 150-450 psi.

In embodiments during operation, water, ammonia and $CO_2$ evaporate from the bottom of the regeneration column, and this stream heats the down coming mixed salt stream leaving a potassium rich solution at the bottom of the regenerator. In embodiments, the composition of potassium salts in the bottom of the regeneration column is >4 molal while the concentration of ammonia salts<4 molal.

System Configuration

In embodiments is a system for carrying out the method as herein, the system comprising: the absorber column containing the absorption solution and configured to enable absorption of $CO_2$ from the $CO_2$-containing gas into the absorption solution to form the $CO_2$-rich solution; a regeneration column in fluid communication with the absorber column and configured to remove $CO_2$ from the $CO_2$-rich solution to form a purified $CO_2$ gas stream and a $CO_2$-depleted solution; and an optional flash chamber in fluid communication with the regeneration column and in fluid communication with the absorber column, and configured to remove ammonia from a regeneration solution obtained from the regeneration column.

In embodiments, the regeneration column is configured to accept $CO_2$-rich solution from the absorber and to subject the $CO_2$-rich solution to desorption conditions producing a purified $CO_2$ gas stream and a $CO_2$-depleted solution. In embodiments, the flash chamber is configured to receive $CO_2$-depleted solution from the regeneration column and to remove ammonia from the $CO_2$-depleted solution to form an ammonia-depleted $CO_2$-depleted solution. The regeneration column may further be configured to receive an ammonia-depleted $CO_2$-depleted solution from the flash chamber. Herein, by "configured to receive" is meant that suitable inlet/outlet ports and conduits are present to transfer material from the source to the destination. Additional components such as pumps, valves, filters, and the like may be present as necessary. Thus, for example, in embodiments, the system comprises a conduit providing fluid communication between a section of the regeneration column containing a $CO_2$-depleted solution and the absorber column, and/or the system comprises a conduit providing fluid communication between a section of the regeneration column containing a $CO_2$-depleted solution and the flash chamber.

In an embodiment wherein the optional flash chamber is present, the absorber column comprises three inputs and two outputs. A first input is a $CO_2$-containing gas such as described herein, which is pumped into the absorber column at or near the bottom of the column (e.g., at the lowest-most point or within 1, 3, 5, 10, or 15% of such point). For example, within 1% of the bottom of a 100-ft column would be within 1 foot of the lowest-most point of the column. A second input is an ammonia-depleted solution that is received from the flash chamber, which is pumped into the absorber column at or near the top of the column (e.g., at the highest-most point or within 1, 3, 5, 10, or 15% of such point). A third input is a $CO_2$-depleted solution that is received from the regeneration column (i.e., from the bottom section of the regeneration column, such as within 30, 25, 20, 15, 10, or 5% of the bottom of the regeneration column), which is pumped into a middle section of the absorber column (e.g., at the midpoint, or within 5, 10, 15, 20, 25, 30, or 35% of such point). The first output is a $CO_2$-depleted gas, which is removed from the absorber column at or near the top of the column (e.g., at the top or within 1, 2, 3, 4, or 5% of the top). The second output is a $CO_2$-rich solution, which is removed from the absorber column at or near the bottom of the column (e.g., at the lowest-most point or within 1, 3, 5, 10, or 15% of such point). The regeneration column comprises two inputs and three outputs. The first input is the CO2-rich solution from the absorber column, which enters the regeneration column at or near the top of the column (e.g., at the highest-most point or within 1, 3, 5, 10, or 15% of such point). The first output is a purified $CO_2$ gas stream, which is removed from the regeneration column at or near the top of the column (e.g., at the top or within 1, 2, 3, 4, or 5% of the top). The second output is the $CO_2$-depleted solution that is received by the absorber column, which is removed from the bottom of the regeneration column as mentioned above. The third output is an ammonia-rich solution that is received by the flash chamber, and which is extracted from the bottom section of the regeneration column (e.g., at the lowest-most point or within 1, 3, 5, 10, or 15% of such point). The second input, then, is an ammonia-depleted solution that is received from the flash chamber (e.g., which is extracted from a top section of the flash chamber) and which enters the regeneration column at a middle section (e.g., at the midpoint, or within 5, 10, 15, 20, 25, 30, or 35% of such point). Various heat exchangers may be positioned within the system as appropriate.

In an embodiment wherein the flash chamber is absent, the absorber comprises three inputs and two outputs. The first input is the $CO_2$-containing gas as above. The second input is a $CO_2$-depleted solution from near the bottom of the regeneration column as above. The third input is a potassium rich solution that is obtained from the bottom section of the regeneration column and is pumped into the top section of the absorber column. The first output is a $CO_2$-depleted gas as above. The second output is a $CO_2$-rich solution as above. The absorber column contains a first section rich in ammonia (and dissolved ammonium salts), which is located in the bottom two-thirds of the column. The absorber column further contains a second section rich in potassium ($K^+$ salts), which is located in the top one-third of the column. The regeneration column has one input and three outputs. The input is a $CO_2$-rich solution as above. The first output is a potassium-enriched solution obtained from the bottom section of the absorber. The second output is an ammonia-rich solution also obtained from near the bottom of the regeneration column. The third output is a purified $CO_2$ gas stream. Various heat exchangers may be positioned within the system as appropriate.

Amine-Containing System

One currently available $CO_2$-capture is an amine-based technology. The main problem with conventional amine technology is amine loss due to degradation and volatilization. Amine volatilization is enhanced by $SO_3$, which is formed by oxidation of $SO_2$ in the flue gas inside absorber. Generally, in Amine based $CO_2$ scrubbers, the flue gas stream is polished to remove $SO_2$ down to less than 10 ppm.

Hindering the degradation of amines in the $CO_2$-capturing process is important both (i) for economical purposes when it comes to loss of solvent and impacts on the process, and (ii) to prevent formation of decomposition products leading to heat stable solid (HSS) formation and precursors of dioxin forming compounds such as nitrosamines. One of the key initial degradation products is 2-oxazolidinone (OZD). The mechanism for formation of OZD is through the loss of amine group from MEA to form ethylene oxide, which then reacts with $CO_2$ followed by a reaction with MEA. If ammonia is present in the system, such reaction can be mitigated. This is because ammonia provides a competing path (Ethylene Oxide+Ammonia+Water→Amines) to remove ethylene oxide thus reducing the formation of OZD.

Furthermore, typical commercial MEA production is by reacting ethylene oxide with ammonia. In the commercial process, the reaction of ethylene oxide with ammonia in the presence of water leads to primary and secondary amines. Primary amine (MEA) is separated by first removing ammonia, which is the most expensive part of the MEA production process. For $CO_2$ capture application this ammonia removal is not necessary. Therefore, ammonia and amine mix suitable for $CO_2$ capture process can be produced at a lower cost than it would be for producing a pure MEA solution.

Thus, if a $CO_2$ scrubbing solution comprised of ammonia and amine (or amine mixture) is used for capturing $CO_2$ from a flue gas mixture from a natural gas or coal power plant, the dual absorber system proposed in the mixed-salt process herein can be used. The benefits include: having a sufficient ammonia concentration in the bottom section of the absorber will react with SOx in the flue gas thereby reducing its effect on the amine; ammonia will act as an inhibitor for amine degradation, therefore amine make-up requirement will be reduced; a solvent mixture containing ammonia and amine can be formulate at a lower cost compared to pure amine solution; and since ammonia is more volatile than the amine, preferred ammonia/amine mixtures can be prepared in the regenerator step similar to the mixed-salt process.

If a mixture of ammonia and amine is used in a manner described in the mixed-salt process, $SO_2$ in the flue gas is trapped as ammonium sulfate. As such $SO_3$ formation is reduced. Furthermore, a major cost in the conventional Amine process is the need to add new amine continuously to make up for the loss of amine. The mixed salt process with added amines described herein mitigates this problem.

Accordingly, the multi-section absorber system with mixed-salt as described herein can also be used with added amine for enhanced $CO_2$ Capture. As an example, mixtures ammonia and amine (mono ethanol amine [MEA] or other amines) are suitable. In such embodiments, the first (bottom) section of the absorber column will have high ammonia concentration and the second (top) section of the absorber column will be enriched in amine but still containing a relatively lower ammonia concentration.

$CO_2$-Containing Gas Source and Composition

The $CO_2$-containing gas is a gas mixture. In embodiments, the $CO_2$-containing gas is a flue gas from a power plant or other such source. In embodiments, the $CO_2$-containing gas comprises other components, such as one or more of $N_2$, $O_2$, $NO_x$, $SO_x$ and other acid gases. In an embodiment the $CO_2$-containing gas is a flue gas comprising 5 to 15 vol % $CO_2$, $N_2$, $O_2$, $NO_x$, $SO_x$ and other acid gases. In embodiments, the $CO_2$-containing gas comprises $CO_2$ in an amount between 2-20, or 2-15 vol %, or greater than 2, 3, 4, 5, 7, 10, or 15 vol %.

The described processes require less energy compared with conventional methods, and the cost of $CO_2$ capture can be <$30, 25, or 20 per ton of $CO_2$. There is also obtained more than 50% reduction in energy use and more that 75% reduction in water use compared to conventions methods. In an embodiment, the described process can be integrated downstream of a flue-gas desulfurization (FGD) system of a PC power plant.

EXAMPLES

Example 1

The results from bench-scale testing were good, achieving >95% $CO_2$ capture efficiency for a simulated flue gas stream consisting of 13% $CO_2$ at 40° C. at 1 atm. The loading capacity of the mixed salt was almost three times higher (~170 g of $CO_2$ per kg of solvent) than that of potassium carbonate system. The loading capacity data for potassium carbonate and the mixed salt were determined at 40° C. at 1 atm over $CO_2$ loading values between about 30 to about 80 $Nm^3/t$ solvent.

Bench-scale data showed that the technology can capture >99% of $CO_2$, and has a very high cyclic $CO_2$ loading capacity. Traditional $CO_2$ capture processes utilizing conventional amine solvents are very energy intensive and also susceptible to solvent degradation by oxygen, $SO_x$ and $NO_2$ in coal-fired flue gas, resulting in large operating costs. The mixed-salt technology described herein co-captures the trace levels of $SO_x$ along with $CO_2$, thus providing opportunities for reducing cost associated with flue gas desulfurization. Additionally, the low heat of reaction (35-45 kJ/mol) and lower boiler duty (<800 Btu/lb) for regeneration enables better heat integration between the $CO_2$ capture unit and the power plant. Table 1 shows the comparison between amine and mixed-salt technologies for $CO_2$ capture. The mixed-salt technology provides a cost of <$20/t $CO_2$.

TABLE 1

Technology Comparison Between Conventional Amine and Mixed-Salt Technology

| Parameter | Conventional Amine | Mixed Salt (herein) |
|---|---|---|
| Solution Circulation Rate | 1 | 0.6 |
| Regeneration energy | 1 | 0.5 |
| Degradation of the Solvent | 1 | 0.1 |
| Solvent Loss | 1 | <0.1 |
| Solvent Cost | 1 | <0.1 |
| Corrosion Inhibitor | Yes | No |
| Flue gas cooling | Yes | Yes |
| FGD Requirement | Deep FGD | Light FGD |
| Hazardous waste | Yes | No |
| $CO_2$ loading | 1 | 1.5 |
| $CO_2$ pressure | 1 | 20 |

Example 2

Thermodynamic calculations were performed to determine feasibility of the Mixed Salt $CO_2$ capture concept. Specifically, the calculations involved: (1) boundary layer for gas-to-liquid mass transfer determination, showing that ammonia promotes the absorption of $CO_2$ into a solution containing potassium carbonate; and (2) thermodynamic modeling to determine the temperature, pressure and composition requires for Mixed-Salt to operate with reduced ammonia vapor pressure compared to other competing ammonia based processes. Equilibrium ammonia vapor pressure at the absorber exit was calculated and plotted as a function of $CO_2$ loading for 10 M ammonia concentration at various temperatures.

Example 3

Flue gas (5 to 15 vol % $CO_2$, $N_2$, $O_2$, $NO_R$, $SO_x$ and other acid gases) enters the absorber from the bottom section at 1 atm and 58° C. The scrubbed gas leaves at the top of the absorber. For 90% $CO_2$ capture, 1.5 vol % $CO_2$ will be leaving the top of the absorber for flue gas streams containing 15% $CO_2$. The $CO_2$ rich solvent leaves the absorber from the bottom section.

Example 4

In a typical test, $CO_2$ rich solvent from the absorber bottom at 30-50° C. is pumped to the top of the regenerator after exchanging heat with the $CO_2$ lean solution from the regenerator.

Example 5

The mixed-salt process chemistry comprises gas/liquid-phase mass transfer followed by chemical reactions in the liquid phase. Selected key reactions associated with the process followed by speciation for $K_2CO_3$—$NH_3$—$H_2O$—$CO_2$ system are:

$CO_2$ (g) $\leftrightarrow$ $CO_2$ (aq)

$NH_3$ (aq)+$CO_2$ (aq)+$H_2O$ (liq) $\leftrightarrow$ $(NH_4)HCO_3$ (aq)

$(NH_4)_2CO_3$+2$CO_2$ (aq)+$H_2O$ (liq) $\leftrightarrow$ 2$(NH_4)HCO_3$ (aq)

2$NH_3$ (aq)+$CO_2$ (aq) $\leftrightarrow$ $(NH_4)NH_2CO_2$ $(NH_4)NH_2CO_2$ (aq)+$CO_2$ (aq)+2$H_2O$ (liq) $\leftrightarrow$ 2$(NH_4)HCO_3$ (aq)

$K_2CO_3$ (aq)+$CO_2$ (aq)+$H_2O$ (liq)+Catalyst $\leftrightarrow$ 2$KHCO_3$ (aq)+Catalyst Species in the $K_2CO_3$—$NH_3$—$CO_2$—$H_2O$ system includes $H_2O$ $CO_2$ (g), $H_2O$ (g), $NH_3$ (g), $CO_2$ (aq), $NH_3$ (aq), $CO_3^{-2}$, $HCO_3^-$, $H^+$, $K^+$, $NH_2CO_2^-$, $NH_4^+$, $OH^-$, $K_2CO_3$ (s), $KHCO_3$ (s), $(NH_4)_4H_2(CO_3)_3$ (s), $NH_4HCO_3$ (s), $K_2CO_3 \cdot 1.5H_2O$. Solid species are not present in the mixed-salt system.

The chemical reactions in the ammonia-based process are all reversible, and their direction depends on pressure, temperature, and concentration in the system. At low temperature, the above equations are exothermic reactions from a left-to-right direction and require removal of heat from the process in order to maintain the desired absorption temperature. At high temperature, the equations are endothermic reactions from a right-to-left direction that require energy to release gaseous $CO_2$. The heat of reaction for the process can be tuned depending on the composition of the mixture (potassium and ammonium salt ratio). Mixtures with 40-50 kJ/mole heat of reaction were tested although others may be suitable for a desired outcome.

Example 6

The mixed salt $CO_2$ capture system comprises a dual-stage isothermal absorber, a regenerator, and auxiliary equipment. The absorber consists of top section (Absorber 2) with potassium-rich solvent and a bottom section (Absorber 1) with ammonia-rich solvent. The absorber can be assembled either as single absorber in two sections or as two separate absorbers in series. Flue gas from the power plant enters the bottom section of the absorber after passing through the FGD unit; following cooling to 30°-40° C., 50-80% of the $CO_2$ gets absorbed in the first absorber. The remaining $CO_2$ in the flue gas is absorbed in the top section of the absorber (Absorber 2).

The bottom stage operates with liquid recycle and cooling to keep the solution at just above cooling water temperature (30° C.-40° C.) and to maintain the absorber at relatively uniform temperature. In a two-stage absorber, the bottom stage operates with the highest $CO_2$ loading in the range of 0.6-0.7 mole of $CO_2$ per mole of ammonia and about 0.7-0.8 mole of $CO_2$ per mole of potassium. The heat of reaction is removed from the bottom stage using the heat exchanger in the recycle loop. The $CO_2$-rich solution from the bottom stage is constantly removed from the bottom via a bleed stream on the recycle loop. The $CO_2$-rich solution is sent to the regenerator for regeneration.

The mixed-salt process uses a selective regenerator. The key feature of the regenerator is the design that regenerates two $CO_2$-lean salt streams as follows: (1) an ammonia-lean mixed salt to the top stage of the absorber; and (2) an ammonia-rich mixed-salt stream to the bottom stage. In a typical operation, $CO_2$-rich mixed salt from the absorber (fixed $NH_3$ and K compositions with total wt. ~38% and $CO_2$ loadings up to 0.7 $CO_2$/alkali molar ratio) enters the top section of the regenerator. The regenerator is an isobaric high-pressure regenerator (10-40 bar) and has a temperature gradient (top ~60°-70° C., and bottom ~120°-170° C.). At high temperature, the ammonia at the bottom of the regenerator gets vaporized along with water and $CO_2$. Then the ammonia and water get reabsorbed as the vapor moves up the regenerator column, thereby creating an ammonia-rich solution in the mid-section of the regenerator. The $NH_3$-rich, $CO_2$-lean solution from the regenerator is fed to bottom section (Absorber 1 above) of the absorber, and the K-rich $CO_2$-lean solution is fed to the top section (Absorber 2 above).

Reduced Ammonia Emission.

The ammonia vapor pressure at the top of Absorber 1, which operates with an ammonia-rich solution, depends on the temperature of the absorber and the composition of the regenerated lean solvent. This ammonia slip will get reabsorbed at the bottom of Absorber 2. The equilibrium ammonia vapor pressure for the lean solvent at the top of Absorber 2 is very low. As an example, for an absorber operating at 30° C. with the mixed-salt process, the ammonia vapor pressure at the top of Absorber 1 is ~3 kPa and that at the exit of the Absorber 2 is <<0.2 kPa. This ammonia vapor pressure number is more than an order of magnitude smaller than the ammonia vapor pressure from other state-of-the-art ammonia-based process. A comparison of the ammonia vapor pressure of the mixed-salt process and that of 10 m $NH_3$ at 20° C. was also determined.

Because the mixed salt process can reduce ammonia's vapor pressure by more than an order of magnitude (as explained in the section above), an advanced absorber design places less burden on the cooling water requirements. A >90% reduction in water use can be achieved compared to the CAP. Therefore, units such as contact cooler, a chiller for solvent cooling, a large water wash, and a sour water stripper will either be completely eliminated or reduced in size (90% smaller) compared to CAP in our proposed systems. The mixed-salt system footprint will be further reduced due to the high efficiency of the mixed-salt process (faster kinetics and reduced absorber sizes).

Example 7

The absorption rate enhancement was confirmed through laboratory tests and explained the reason for low carbonate ion mobility (the extent of the hydration sphere for reduced diffusion) by available ab-initio modeling of the reactivity of carbonate ion in water. In the lab-scale tests, 12 vol % $CO_2$ (~0.5 to 5 acfm gas flow rate) was used to demonstrate the process rate enhancement. Tests were conducted at varying starting $CO_2$ loadings. Tests with neat (pure) 3 m $K_2CO_3$ (~41 wt. %) loading were also conducted to compare the rate enhancement in the mixed-salt process. Data was collected from testing at 30° C. measured at 1 bar with a 38% mixed-salt solution and neat $K_2CO_3$. The measured working capacity for $K_2CO_3$ was compared with a mixed-salt system that has 3 times higher $CO_2$ loading capacity than neat $K_2CO_3$ systems.

Effect of Temperature on the Rate of $CO_2$ Absorption. The rate of $CO_2$ absorption can be increased by increasing the temperature as long as the solvent volatility is sufficiently low and the Gibbs free energy for the reaction is negative. Data was collected for the ammonia-based system measured for 4 m ammonia solution. This data was obtained by measuring the $CO_2$ rate using a static absorber. The $CO_2$ absorption at 1 bar was measured at varying temperatures and $CO_2$ loadings as shown. As expected, equilibrium is established very quickly with increasing temperature, and the reverse reactions (Equations discussed above) become important. At lower temperatures, the rates of reactions are low, and the system equilibrium is slow. In the chilled-ammonia and aqueous-ammonia processes, lower temperatures are used to avoid ammonia evaporation; therefore, there is no opportunity to operate the process at a more desirable temperature range (30°-45° C.). The mixed-salt process described herein is advantageous since it operates at the desirable temperature range 30°-45° C.; the $CO_2$ absorption kinetics in mixed-salt process is about 5 times higher than that in chilled ammonia.

The invention encompasses all combinations of recited particular and preferred embodiments. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

What is claimed is:

1. A process for capturing purified $CO_2$ from a $CO_2$-containing gas, comprising steps:
   (a) contacting in an absorber column the $CO_2$-containing gas with an absorption solution comprising water, ammonia, and potassium carbonate, to enable adsorption of $CO_2$, thereby producing a $CO_2$-depleted gas and a $CO_2$-rich solution; and
   (b) subjecting the $CO_2$-rich solution to desorption conditions in a regeneration column producing a purified $CO_2$ gas stream and a $CO_2$-depleted solution.

2. The process of claim 1, wherein the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1.

3. The process of claim 1, wherein the absorption solution in a third section of the absorber column has a lower ammonia concentration relative to the absorption solution in a first section of the absorber column and a higher ammonia concentration relative to the absorption solution in a second of the absorber column.

4. The process of claim 1, wherein the absorption solution comprises ammonia, ammonium carbonate, ammonium bicarbonate, potassium carbonate, and potassium bicarbonate.

5. The process of claim 1, further comprising pumping the $CO_2$-depleted solution to the absorber column.

6. The process of claim 1, further comprising the steps:
   (c) pumping the $CO_2$-depleted solution from a first section of the regeneration column to a flash chamber, wherein the flash chamber removes ammonia from the $CO_2$-depleted solution to form an ammonia-depleted $CO_2$-depleted solution; and (d) pumping the ammonia-depleted $CO_2$-depleted solution to the absorber column.

7. The process of claim 1, wherein the regeneration column comprises a regeneration solution, and a temperature gradient exists within the regeneration column such that the temperature of the regeneration solution at a second section of the regeneration column is lower than the temperature of the regeneration solution at a first section of the regeneration column.

8. The process of claim 1, wherein the desorption conditions comprise a temperature above 30° C. and a pressure above 5 bar.

9. The process of claim 1, wherein the absorption solution in a bottom section of the absorber column is maintained at a temperature of between 20-40° C.

10. The process of claim 1, further comprising pumping the $CO_2$-depleted solution to the absorber column, and wherein the absorption solution comprises ammonia, ammonium carbonate, ammonium bicarbonate, potassium carbonate, and potassium bicarbonate.

11. The process of claim 1, further comprising pumping the $CO_2$-depleted solution to the absorber column, and wherein the regeneration column comprises a regeneration solution, and a temperature gradient exists within the regeneration column such that the temperature of the regeneration solution at a second section of the regeneration column is lower than the temperature of the regeneration solution at a first section of the regeneration column.

12. The process of claim 1, further comprising pumping the $CO_2$-depleted solution to the absorber column, and wherein the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1.

13. The process of claim 1, further comprising the steps:

(c) pumping the $CO_2$-depleted solution from a first section of the regeneration column to a flash chamber, wherein the flash chamber removes ammonia from the $CO_2$-depleted solution to form an ammonia-depleted $CO_2$-depleted solution; and (d) pumping the ammonia-depleted $CO_2$-depleted solution to the regeneration column, and wherein the absorption solution comprises ammonia, ammonium carbonate, ammonium bicarbonate, potassium carbonate, and potassium bicarbonate.

14. The process of claim 1, further comprising the steps:

(c) pumping the $CO_2$-depleted solution from a first section of the regeneration column to a flash chamber, wherein the flash chamber removes ammonia from the $CO_2$-depleted solution to form an ammonia-depleted $CO_2$-depleted solution; and (d) pumping the ammonia-depleted $CO_2$-depleted solution to the regeneration column, and wherein the absorption solution in a first section of the absorber column comprises a dissolved ammonia to total potassium ratio greater than 1:1, and wherein the absorption solution in a second section of the absorber column comprises a dissolved ammonia to total potassium ratio less than 1:1.

15. A system for capturing purified $CO_2$ comprising: an absorber column containing an absorption solution comprising water, ammonia, and potassium carbonate; a regeneration column in fluid communication with the absorber column; and an optional flash chamber in fluid communication with the regeneration column and in fluid communication with the absorber column.

* * * * *